(12) United States Patent
Aldhaheri et al.

(10) Patent No.: US 11,075,934 B1
(45) Date of Patent: Jul. 27, 2021

(54) HYBRID NETWORK INTRUSION DETECTION SYSTEM FOR IOT ATTACKS

(71) Applicant: King Abdulaziz University, Jeddah (SA)

(72) Inventors: Sahar Ahmed Aldhaheri, Jeddah (SA); Daniyal Mohammed Alghazzawi, Jeddah (SA)

(73) Assignee: KING ABDULAZIZ UNIVERSITY, Jeddah (SA)

(*) Notice: Subject to any disclaimer, the term of this patent is extended or adjusted under 35 U.S.C. 154(b) by 0 days.

(21) Appl. No.: 17/190,831

(22) Filed: Mar. 3, 2021

Related U.S. Application Data

(60) Provisional application No. 63/150,466, filed on Feb. 17, 2021.

(51) Int. Cl.
*G06N 3/08* (2006.01)
*G06F 21/00* (2013.01)
(Continued)

(52) U.S. Cl.
CPC .......... *H04L 63/1425* (2013.01); *G06F 21/00* (2013.01); *G06F 21/55* (2013.01);
(Continued)

(58) Field of Classification Search
CPC . H04L 63/1425; H04L 63/1458; H04L 67/12; G06F 21/00; G06F 21/55; G06N 3/08; G16Y 20/10; G16Y 40/30
See application file for complete search history.

(56) References Cited

U.S. PATENT DOCUMENTS

| 9,596,259 B2 | 3/2017 | Handel et al. |
| 10,848,448 B2 | 11/2020 | El-Alfy et al. |

(Continued)

FOREIGN PATENT DOCUMENTS

| CN | 102123062 A | 7/2011 |
| CN | 103679025 A | 3/2014 |

OTHER PUBLICATIONS

Greensmith et al., The Deterministic Dendritic Cell Algorithm, Proceedings of the 7th International Conference on Artificial Immune Systems (ICARIS 2008), Phuket, Thailand, p. 291-303 (Year: 2008).*

(Continued)

*Primary Examiner* — Jung W Kim
*Assistant Examiner* — Howard H. Louie
(74) *Attorney, Agent, or Firm* — W&C IP

(57) ABSTRACT

A Deep Learning Dendritic Cell Algorithm (DeepDCA) is employed in an intrusion detection system (IDS) and method. The framework adopts both a Dendritic Cell Algorithm (DCA) and a Self Normalizing Neural Network (SNN). The IDS classifies interned of things (IoT) intrusion, while minimizing false alarm generation, and it automates and smooths the signal extraction phase which improves the classification performance. The IDSselects the convenient set of features from the IoT-Bot dataset, and performs their signal categorization using the SNN. Experimentation demonstrated that the IDS with DeepDCA performed well in detecting IoT attacks with a high detection rate demonstrating over 98.73% accuracy and a low false-positive rate. Also, IDS was capable of performing better classification tasks than SVM, NB, KNN and MLP classifiers.

11 Claims, 7 Drawing Sheets
(5 of 7 Drawing Sheet(s) Filed in Color)

(51) Int. Cl.
*G06F 21/55* (2013.01)
*G16Y 40/30* (2020.01)
*G16Y 20/10* (2020.01)
*H04L 29/06* (2006.01)
*H04L 29/08* (2006.01)

(52) U.S. Cl.
CPC ............... G06N 3/08 (2013.01); *G16Y 20/10* (2020.01); *G16Y 40/30* (2020.01); *H04L 63/1458* (2013.01); *H04L 67/12* (2013.01)

(56) References Cited

U.S. PATENT DOCUMENTS

| | | | | |
|---|---|---|---|---|
| 2015/0106306 A1* | 4/2015 | Birdwell | ................. | G06N 3/02 706/11 |
| 2015/0106316 A1* | 4/2015 | Birdwell | ................. | G06N 3/02 706/33 |
| 2017/0374091 A1* | 12/2017 | Igbe | ....................... | G06N 20/00 |
| 2020/0341098 A1* | 10/2020 | Murphy | ............... | G01R 33/307 |

OTHER PUBLICATIONS

Farzadnia et al: "A New Intrusion Detection System using the Improved Dendritic Cell Algorithm", Research Article, Apr. 22, 2020.

Shafic et al: "Improving Accuracy of Immune-inspired Malware Detectors by using Intelligent Features", Gecco'08, Jul. 12, 2008.

Yang et al: "Dendtritic Cell Algorithm Enhancement Using Fuzzy Inference System for Network Intrusion Detection", IEEE, 2019.

* cited by examiner

Algorithm 1 SSN for Signal Categorization.

Input: Features $(f_1, f_2, ..., f_N)$;

Output: Signals as safe (SS) and danger (DS)

1: initialise number of hidden layers L, weights w;
2: for i in Number of inputs do
3:     Add input $f_i$;
4:     Add neuron $H_{S,i}$ SeLU activation & connect with $f_i$;
5:     Add neuron $H_{D,i}$ SeLU activation & connect with $f_i$;
6:     Add *AlphaDropout* Layer for the SS;
7:     Connect it with $H_{S,i}, i = 1, ..., Number\ of\ inputs$;
8:     Add AlphaDropout Layer for DS;
9:     Connect it with $H_{D,i}, i = 1, ..., Number\ of\ inputs$;
10:     Add neuron S with *sigmoid* activation;
11:     Connect it with the AlphaDropout Layer for SS;
12:     Add neuron D with sigmoid activation
13:     Connect it with the AlphaDropout Layer for DS;
14: end for
15: while no of epochs not complete & condition not fulfilled do
16:     Update weights;
17:     Compute training and validation loss;
18:     Evaluate model performance;
19: end while

Figure 3

HYBRID NETWORK INTRUSION DETECTION SYSTEM FOR IOT ATTACKS

CROSS-REFERENCE TO RELATED APPLICATIONS

This application claims priority to U.S. Ser. No. 63/150,466 filed Feb. 17, 2021, and the complete contents thereof is herein incorporated by reference.

FIELD OF THE INVENTION

The invention is generally related to a system and method for improvement in classification of "Internet of Things" (IoT) intrusions and minimization of false alarm generation.

BACKGROUND

Recently, in both academic and industrial circles, Internet of Things (IoT) have become an active area for research and development. According to Cisco, 500 billion devices will be connected by the year 2030 [1]. Although this technology is promising in many sectors, such as smart homes, healthcare, intelligent transportation, power smart grid and numerous areas that not yet even conceived [2], it carries with it many security risks. Easy accessibility and tremendous propagation of IoT devices creates a fertile environment for cyber attacks. Most of these devices are small, inexpensive and have limited memory and computing capacity to run the current existing security software [3]. Additionally, the Original Equipment Manufacturers (OEMs) are using commercial embedded Real-Time Operating Systems (RTOS), such as FreeRTOS and OpenRTOS to minimize the cost [4] which makes these end devices vulnerable to be targeted. As stated by a report for Malwarebytes, the IoT attacks will continue at steady levels with increased sophistication [5].

For example, recent malware such as Mirai [6] and Ransomware of Things (RoT) [7,8] have proven that conventional security methods are ineffective and do not provide decentralized and strong security solutions. In addition to the urgent need for a new paradigm of security commensurate with the changes that have emerged with the IoT ecosystem. Where the security problems inherited from the traditional network alongside the Advanced Persistent Threat (APT).

Therefore, to dissolve the obstacles security of IoT we must look at solutions from a comprehensive perspective and take into account new circumstances and requirements. Lately, multiple solutions have been applied to secure the IoT environment and guarantee security requirements like authentication, availability, integrity, confidentiality and privacy [9]. From another aspect, the Artificial Immune System (AIS) is a bionic intelligent system that mimics the biological immune system and its way to protect against foreign or dangerous invaders [10]. AIS has proven effective in protecting TCP/IP networks [11,12], Wireless Sensor Networks (WSN) [13,14], and the Mobile Ad Hoc Network (MANET) [15,16]. This makes it more suitable for a dynamic and changeable environment such as IoT. Moreover, the human immune system properties make it a perfect approach to resolve IoT security dilemmas. Due to its ability for self-learning, and its adaptability robustness, resource optimization, dynamic structure, and lightweight [17], it is adaptable for various applications such as computer security [18], intrusion detection [19,20], anomaly detection [21], data analysis [22,23], pattern recognition [24] and scheduling [25,26].

AIS methods solve multi-objective optimization problems successfully [27,28], including control engineering [29,30] and robotics [31]. After extensive IoT attacks, there have been a number of proposed recommendations and solutions to avoid infection. The suggested solutions can generally be summed up as 1) to change the default passwords for the IoT devices, 2) disable some ports, and 3) guide consumers and manufacturers to use more secure devices. Although these security practices are effective and provide the first line of defense, their application is limited to security management and human interaction.

Another challenge in the case of known software vulnerabilities is the delay of download the patches. Under these conditions, intrusion detection techniques become more important.

In U.S. Patent Publication 2017/0374091, there is described combining two algorithms from an Artificial Immune System (namely Negative Selection Algorithm (NSA) and Dendritic Cell Algorithm (DCA), and running in parallel. The NSA is used to generate a population of detectors that are used for detecting anomalies via a matching criterion. The DCA is used to sample the traffic and signals coming in or out of the data processing system. An aggregation system is used to combine the individual decisions of the NSA and the DCA to form a single final decision.

In U.S. Pat. No. 9,596,259, a model receives output or signals from multiple indicators, and is configured to combine the plurality of signals into a single signal vector by using the decay factor to weight the received signals so that a large number of "nominal" signals do not drown out a small number of "strong" signals indicating a malware attack.

In U.S. Pat. No. 10,848,448, an approach based on the Dendritic Cell Algorithm (DCA) is used to combine the results of Nave Bayes (NB) and Support Vector Machines (SVM). This method is used for filtering multimodal messages.

A motivation for this invention is that the traditional detection approaches are not able to efficiently detect new variants of IoT attacks.

SUMMARY

In an embodiment of the invention, an Intrusion Detection System (IDS) and method utilizes a novel hybrid Deep Learning and Dendritic Cell Algorithm (DeepDCA). The framework encompasses a Dendritic Cell Algorithm (DCA) and Self Normalizing Neural Network (SNN) for classifying IoT intrusion and minimizing false alarm generation. Also, the system and method automates and smooths the signal extraction phase which improves classification performance.

In an embodiment, the IDSselects a convenient set of features from the IoT-Bot dataset, performs signal categorization using the SNN, and then uses the DCA for classification. Experimentation shows that DeepDCA performed well in detecting the IoT attacks with a high detection rate demonstrating over 98.73% accuracy and low false-positive rate. Also, in comparison to results with State-of-the-art techniques, the IDSsystem and method performrd better classification tasks than SVM, NB, KNN, and MLP.

The artificial immune system has various algorithms that detect different types of attacks. Greensmith introduced this novel danger-based AIS to detect port-scan attacks over wired networks [32]. DCA is inspired by the capability of DCs to receive multiple antigens and signals, as well as reveal the context of each antigen. The Deep Learning and Dendritic Cell Algorithm (DeepDCA) uses an AIS inspired algorithm and addresses the challenges of the IoT environment that make it vulnerable to attacks. The DeepDCA is verified and tested to detect DoS, DDoS, Information gathering and theft. DeepDCA may be generalized to detect other types of attacks on IoT. Various aspects of the invention include, Design a novel IDS composite of Self Normalizing Neural Network (SNN) for signals categorization with Dendritic Cell Algorithm (DCA)

Introduction of the concept of Self Normalizing Neural Network in the DCA signal extraction phase to search for the convenient features, reduce the complexity and automate this phase while preserving excellent performance.

Implementation of the framework on an IoT dataset and evaluate its performance based on a variety of IDS performance metrics.

Use an IoT dataset instead of the out-dated KDD Cup 99 dataset.

To correctly map specific problem domains to the input space of the algorithm DCA requires a data preprocessing phase which contains two main steps: feature reduction and signal categorization. More precisely, DCA selects the most important features (attributes) from the input training data set and assigns each selected attribute to its signal category; either as SS, as DS, or as a PAMP signal. To perform data preprocessing, some have applied manual methods such as involving users or experts in the domain to select or extract the most interesting features and map them into their appropriate signal categories. Some have attempted to automate data preprocessing phases for the DCA by applying some dimensionality reduction techniques such as the principal component analysis, the correlation coefficient, and information gain. By contrast, the present invention, Self-Normalizing Neural Networks (SNN) are used in the preprocessing. The SNN is designed to extract the signals as safe (SS) and danger (DS) signal form the features (f_1, f_2, . . . , f_N). The sigmoid activation function at the output neurons assures that the signals are contained in the range 0-100. Where the selu activation function at the hidden layer neurons admits cutting off high or low values of the feature attribute depending on the signs of the parameters or $v_{S,i}$ pr $v_{D,i}$. The positivity restriction on the weights $w_{S,i}$ and $w_{D,i}$ breaks the symmetry between the formulae for the two signals. It prohibits the SNN from choosing a solution where $w_{S,i}=-w_{D,i}$.

DESCRIPTION OF THE DRAWINGS

The patent or application file contains at least one drawing executed in color. Copies of this patent or patent application publication with color drawings will be provided by the Office upon request and payment of the necessary fee.

The accompanying drawings, which are incorporated in and constitute a part of this specification, illustrate embodiments of the invention and, together with a general description of the invention given above, and the detailed description given below, serve to explain the invention.

FIG. 3 is an exemplary algorithm, Algorithm 1, where Self-Normalizing Neural Networks (SNN) are used in preprocessing, where the SNN is designed to extract the signals as safe (SS) and danger (DS) signal form the features (f_1, f_2, . . . , f_N). The sigmoid activation function at the output neurons assures that the signals are contained in the range 0-100. The SeLU activation function at the hidden layer neurons admits cutting off high or low values of the feature attribute depending on the signs of the parameters $v_{S,i}$ or $v_{D,i}$. The positivity restriction on the weights $w_{S,i}$ and $w_{D,i}$ and breaks the symmetry between the formulae for the two signals. It prohibits the SNN from choosing a solution where $w_{S,i}=-w_{D,i}$.

DETAILED DESCRIPTION

Many technologies are designed to protect the internet from destruction, breaches and unauthorized access. IDSs are one of the essential parts that aim to monitor, analyze the network traffic and detect attacks. According to Hernandez-Pereira, Elena, et al. [33] intrusion can be defined as "any set of actions that attempt to compromise the Confidentiality, Integrity, and Availability (CIA) of information resources." Typical IDS's have an analysis engine, sensors, and a reporting system. The sensors collect network, and host data, and then send it to the analysis engine. Hence, the analysis engine investigates the collected data and detect intrusions. If intrusion exists, the network administrator receives an alert from the reporting system [34].

Figure 1:
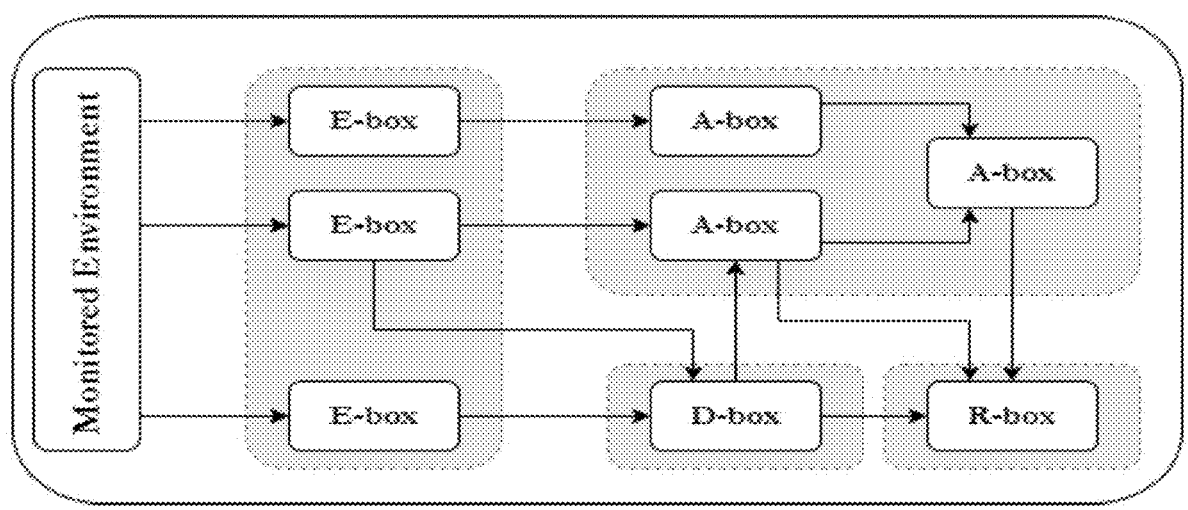
FIG. 1 is a schematic showing the general architecture for an IDSsystem.

FIG. 1 illustrates Intrusion Detection Systems Architecture generally. The architecture of the IDSs functional modules divided into four types: [35] (1) Event-boxes (E blocks): these blocks monitor the target system by sensor elements and acquire the information events; (2) Database-boxes (D blocks): these blocks store information from E blocks; (3) Analysis-boxes (A blocks): these blocks analyze events and detect potential abnormal behavior; and (4) Response-boxes (R blocks): these blocks execute in case an intrusion occurs.

The dynamic characteristics of the Internet of things and the desire to make devices connected anywhere, anytime, and anyplace creates critical challenges about privacy and security. Researchers from the HP lab indicated that almost 70% of IoT devices are vulnerable to be targeted, which means 25 vulnerabilities per device [36]. The vulnerabilities around privacy, lack of encryption standards, authentication/authorization. Additionally, the threats and security problems inherited from the traditional network [37].

IoT attacks are generally classified as occurring on three layers: perception, network, and application-layer [38].

Many non-artificial intelligence-based security methods have been implemented to secure the IoT environment. A good example of these methods: identity-based encryption, watchdog, reputation and trust mechanisms, Complex Event Processing (CEP) and lightweight cryptography. Table 1 summarizes several techniques.

TABLE 1

Non-Artificial Intelligence-based Security Method.

| Ref | Year | Techniques | Metrics | IoT Layer | Simulator | Category |
|---|---|---|---|---|---|---|
| [39] | 2019 | Generic honeypot framework by utilizing VPN connections | Detection rate, low cost and maintenance effort | Applications Layer | Simulation Data | Honeypot |
| [40] | 2016 | Identity-based encryption | Efficiency (overhead cost associated with computation and communication) | Applications Layer | Simulation Data | Lightweight cryptography (LWC) |
| [41] | 2015 | Watchdog, reputation and trust mechanisms | Detection rate, false positives and false negatives. | Network Layer | Simulator Cooja | Intrusion detection system |
| [42] | 2014 | External entity as the ISP or Security as a service (SECaaS or SaaS) provider, to install access control rules in the network | — | Network Layer | Captured the network activity using the Wireshark packet analyzer. | Emerging household appliances |
| [43] | 2014 | Complex event processing (CEP) | CPU utilization, memory consumption and processing hme | Applications Layer | Esper an engine for CEP and event series analysis. | Real-time intrusion |
| [44] | 2013 | Dynamic variable cipher security certificate "one time one cipher" | Repetition rate | Sensor Layer | Simulation Data | Lightweight cryptography (LWC) |
| [45] | 2013 | Role-based detection | Detection rate, false positives | Network Layer | Demo | Intrusion detection system |
| [46] | 2013 | End-to-End message security such as IPsec and DTLS | Detection rate, True positives rate energy and memory consumption | Network Layer | Contiki's network simulator Cooja | Real-time intrusion |

Artificial intelligence has attracted attention in recent years, especially in the field of IoT security. The following Table 2 summarizes the leading technologies that have been introduced to protect the IoT ecosystem.

TABLE 2

Artificial Intelligence-based Security Methods (FS = Features Selection).

| No | Year | Techniques | Dataset | Metrics | IoT layer | FS | Category |
|---|---|---|---|---|---|---|---|
| [47] | 2019 | C5 and One Class Support Vector Machine classifier | Bot-IoT dataset | Detection rate and False positive | Network Layer | Yes | Intrusion Detection System |
| [48] | 2019 | Multilayer Perception (MLP) | ADFA-LD and ADFA-WD | Accuracy, Recall, and F1 | Network Layer | No | Intrusion Detection System |
| [49] | 2018 | Recurrent Neural Network (RNN) + Convolutional Ceural Network (CNN) | RedIRIS. | Accuracy, Precision, Recall, and F1 | Network Layer | No | A network traffic classifier (NTC) |
| [50] | 2016 | Deep-learning (DAE + Deep Feed Forward Neural Network (DFFNN$_3$) | NSL-KDD and UNSW-NB15 | Accuracy, Detection rates, and False Positive Rate | Network Layer | Yes | Anomaly Detection |
| [51] | 2017 | Deep Neural Network + Grid Search Strategy | UNSW-NB15, CIDDS-001, and CPR5. | Accuracy, Percision, Recall and False Alarm Rate. | Transport Layer | No | Anomaly Detection |
| [52] | 2017 | Convolutional Neural Networks (CNN) | IoTPOT | Detection rates, Accuracy | Network Layer | No | Light-weight Detection |

TABLE 2-continued

Artificial Intelligence-based Security Methods (FS = Features Selection).

| No | Year | Techniques | Dataset | Metrics | IoT layer | FS | Category |
|---|---|---|---|---|---|---|---|
| [53] | 2017 | Recurrent Neural Network (RNN) | ISCX Intrusion Detection Dataset and the CTU-13 Dataset | Sensitivity, Specificity, Precision, Confusion Matrix Accuracy and F1 Score | Applications Layer | No | Botnet Detection |
| [54] | 2016 | Stacked Auto Encoder (SAE) Deep learning | KDD99 | Detection rates, and False Positive Rate | Transport Layer | Yes | Intrusion Detection System |
| [55] | 2016 | artificial neural network (ANN) | Collect the data in Testbed | Detection rates, and False Positive Rate | Network Layer | No | Anomaly Detection |
| [56] | 2016 | Artificial Neural Network (ANN) | Simulated IoT network. | Accuracy, and False Alarm Rate. | Applications Layer | No | Threat Analysis |
| [57] | 2016 | Machine Learning + Security as a Service | — | Accuracy, and False Alarm Rate | Transport Layer | No | Integrated Intrusion Detection System |
| [58] | 2013 | Hormone-based Service Detection Algroithm (HSDA) | Simulated IoT network | Stability of the network, Saving energy and Detection rates | Network Layer | No | Anomaly Detection |

Dendritic Cell Algorithm

In 1994, Pollu Matzinger introduced the danger theory and described the immune mechanism through the danger signals activation when damage exists [59,60]. It also states that in the absence of tissue-related danger signals, the innate immune mechanism will be suppressed [61]. This process derived from the cell death process (apoptosis and necrosis). The dendritic cell algorithm (DCA), presented by Green-Smith et al. is considered as a de facto danger theory algorithm. DCA goes through four phases as detailed below [62]:

Phase 1. Pre-processing and initialization: this phase includes two main steps: feature reduction and signal categorization. First, feature reduction which selects the most important attributes from the training set. Next, the selected features classify to signal category: safe, danger and PAMP.

Phase 2. Detection: in this phase, the DCA has to generate a signal database by combining the input signals with the antigens to obtain cumulative output signals.

Phase 3. Context Assessment: the generation of cumulative output signals from the detection phase are used to perform context assessment of antigens. If the collected antigens by a DC has a greater Mature DCs (mDC) than its Semi-Mature DCs (smDC) value, it is labeled as 1, otherwise 0.

Phase 4. Classification: the calculated value deriving from the Mature Context Antigen Value (MCAV) for each antigen is used to assess the degree of the anomaly. When the value of MCAV is closer to 1, the antigen probability of been anomalous is higher. The MCAV of antigen is calculated by dividing the number of times an antigen appears in the mature context by the total number of that antigen presentation. When the MCAV is calculated, the classification task starts by comparing the MCAV of each antigen to an anomalous threshold. Antigens with MCAVs greater than the anomaly threshold are classified into the abnormal otherwise are classified into normal.

Self-Normalizing Neural Networks

Self-normalizing neural networks are introduced in 2017 by Gnter Klambauer [63]. It is a higher-level abstraction neural networks where the neuron activations automatically concentrate on a fixed mean and variance. Unlike other neural networks algorithms that lack the ability to normalizing the outputs and need further layers such as batch normalization [64]

SELU Activations: The activation function proposed in SNN is Scaled exponential linear units (SELU). It is similar to the Rectified Linear Units (ReLU) but with a simple exponential function. The SELU activation function is defined as:

$$sel(x) = \lambda \begin{cases} x & \text{if } x > 0 \\ \alpha e^x - \alpha & \text{if } x \leq 0 \end{cases} \quad (1)$$

where x denotes input $\alpha$ ($\alpha$=1.6733), $\lambda$ ($\lambda$=1.0507) are hyper parameters which control the mean and variance of the output distribution.

Alpha Dropout: Ordinarily, the neurons dropout in a random way by setting his weight to zero with probability 1−p. In doing this the network is prevented from setting the mean and variance to an expected value. The ReLUs works very well with the standard dropout for the following reason: zero goes down to the low variance region which is the default value. In the case of SELU, we have that the default low variance is given by $\lim_{x \to \infty} sel u(x) = -\lambda\alpha = \alpha'$ and for this reason the standard dropout does not fill well. Then for sets that the input values randomly to $\alpha'$, alpha dropout is the proposed to fit them well. The original values of mean and variance are restored by alpha dropout and the self-normalizing property is preserved too. Therefore, by making activation into negative values saturation at random alpha dropout suits SELU.

Using of AIS approaches to secure the IoT started in 2010. Below is a summary which discusses AIS methods that have been used to secure the IoT area based on the IoT layers.

Sense Layer: Many solutions based on AIS have been applied to secure the physical layer communication. The work of Chmielewski and Brzozowski [65], presented a "support system for existing solutions" embedded in a re-programmable FPGA (Field Programmable Gate Array). This model based on hybrid negative selection algorithm, called b-v model to detect the zero-day attacks. In addition, Chen et al. [66] investigated and computed the intensity value of security threats faced by IoT. They addressed a theoretical security situation sense model. This model consists of a security threat sense sub-model (STS) and a security situation assessment sub-model (SSA). This work introduced a notable mathematical theoretical model but this would be more interesting if it describes how to apply it within IoT and what type of data could be used.

Network Layer: So far, most of the AIS-based studies have been carried out in the network layer to handle the IoT security. A signature-based IDS proposed by Liu et al. [67]. This IDS contains memory detectors that simulate the antigens in the human body and classify datagrams as normal and malicious. In spite of that theory mathematically analyzed and detected a various number of intrusions, it has a high computational running and the researchers did not specify how to implement it in limited resources devices. Additionally, a dynamic approach called Artificial Immune System Response Model (AISRM) was produced by Liu et al. [68]. The proposed model captures the IoT data packets and transforms them into immune antigens then detects and responds to attacks. Although this is an adaptable model proven through a simulation experiment, the central server scalability is a significant problem where all communication passes through.

Application Layer: For the application layer, smart homes represented the majority. In this context Arrignton et al. [69] proposed a Behavioral Intrusion Detection System based on positive and negative selection algorithms. This work provides an important insight into the process of detecting abnormal behavior related to non-playing characters such as a human. Nonetheless, due to the expanding of IoT network, this would delay the performance and leads to consumption of the resources. And conversely, in order to reduce the cost and time and provide the optimal solution, Yang et al. [70] developed a multi-objective optimization model.

DeepDCA: Deep Learning Dendritic Cell Algorithm

Figure 2:
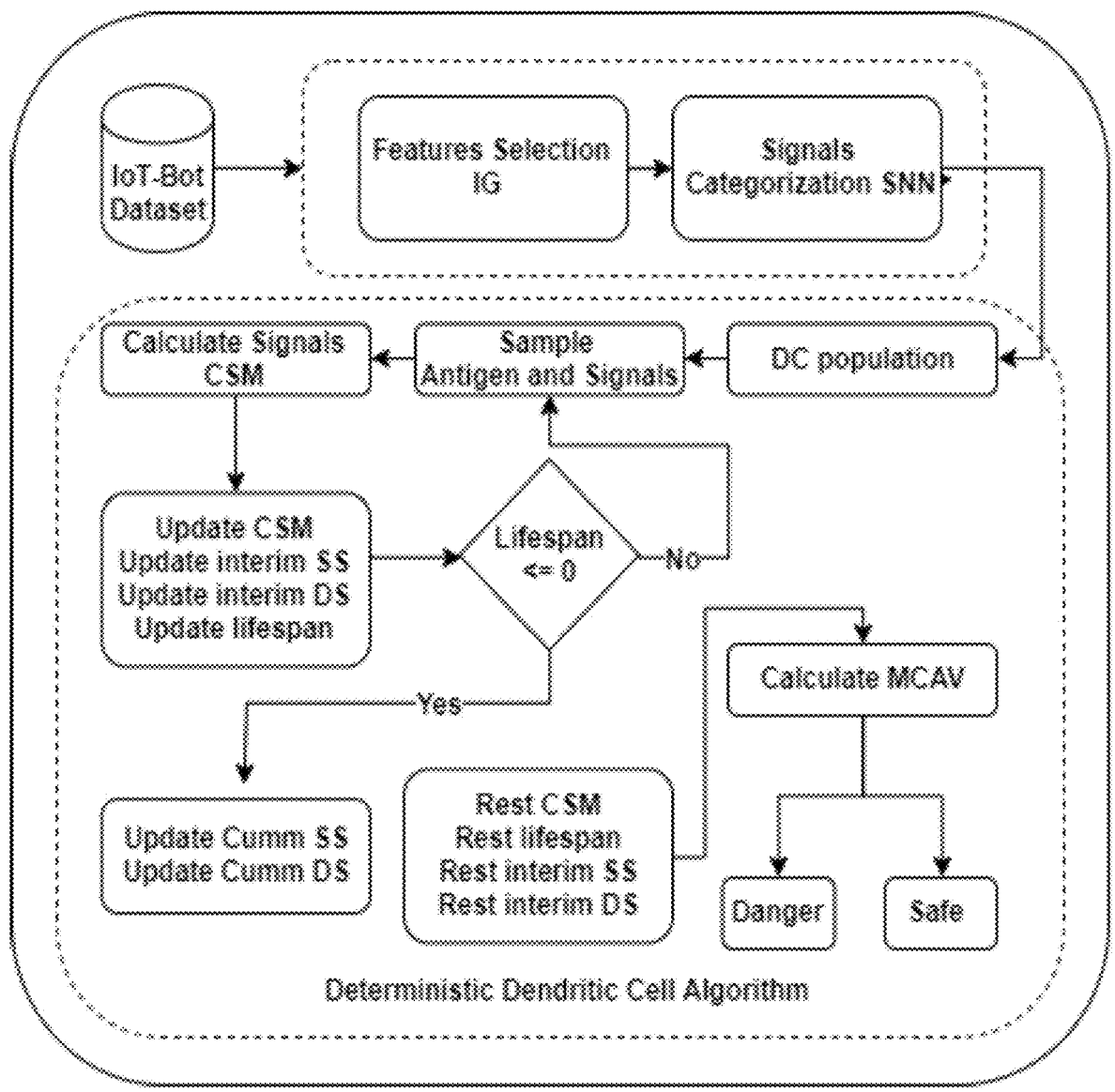
FIG. 2 is a flowchart illustrating the processes of Deep-DCA in the context of the invention.

This Section presents the DeepDCA model for the automate DCA data pre-processing phase. As shown in FIG. 2, the framework comprises three main steps, namely: Features Selection, Signals Categorization, and Deterministic Dendritic Cell algorithm. The proposed approach functions will mainly focus on the pre-processing phase, but is applicable more generally.

Feature Selection: This framework adopts the Information Gain (IG) approach to decide which features are more important. The IG(F) is a measure of the reduction in entropy of variable F that is archived by learning after the value for the feature is observed. In Data Science the information gain used for ranking the features has a feature with high information gain ranked higher than others, and has a strong power in the classification process. The IG can be obtained by [71]:

$$IG(S) = E(F) - \sum_{v \in values(S)} \frac{|F_v|}{|F|} * E(F_v) \quad (2)$$

where IG is the gain, value (S) is symbolized by all the possible values of an attribute S. Moreover, $F_v$ is a subset generated by partitioning S based on feature F, and E(F) is the entropy which computed as the following:

$$\text{Entropy } (F) = \sum_{i=1}^{i=2} -p_i * \log_2 p_i \quad (3)$$

Figure 4:
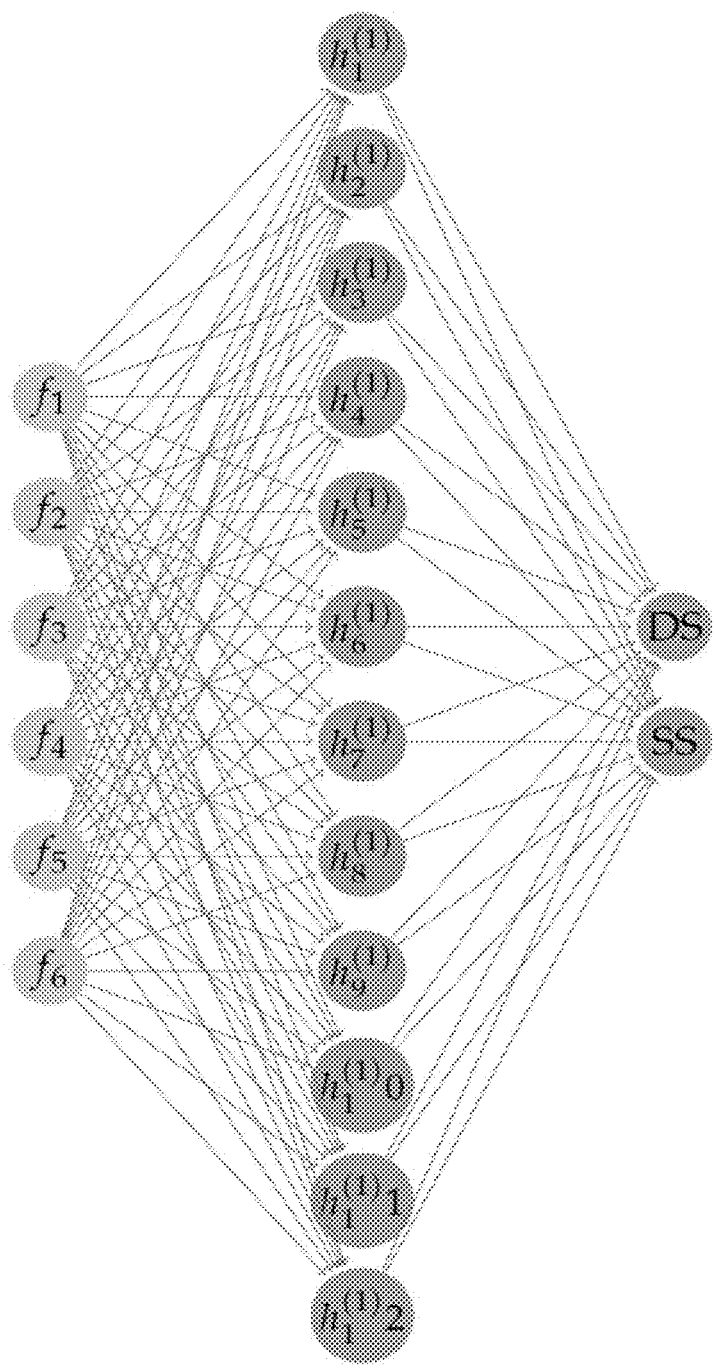
FIG. 4 is a schematic illustrating an exemplary SSN architecture for signal categorization.

The SNN Signal Categorization: The SNN module assign each selected attribute to specific signal category (see FIG. 4). The guidelines for signal categorization are presented below:

Danger Signal: this signal indicates to the presence of anomalous situation or attack circumstances Safe Signal: this signal indicates to the presence of normal behavior or non-attack circumstances Generation of DCA Signals The SNN is designed to extract the signals as safe (SS) and danger (DS) signal form the features ($f\_1, f\_2, \ldots, f\_N$) as the following parametrized:

$$SS(f_1, f_2, \ldots, f_N) = 100 * \text{sigmoid}\left(b_S + \sum_i w_{S,i} * selu(b_{S,i} + v_{S,i} * f_i)\right) \quad (4)$$

$$SD(f_1, f_2, \ldots, f_N) = \quad (5)$$
$$100 * \text{sigmoid}\left(b_V + \sum_i w_{D,i} * selu(b_{D,i} + v_{D,i} * f_i)\right)$$

where $$w_{S,i} \text{ and } w_{D,i} >= 0 \quad (6)$$

The sigmoid activation function at the output neurons assures that the signals are contained in the range 0-100. Where the SeLU activation function at the hidden layer neurons admits to cut off high or low values of the feature attributes, depending on the signs of the parameters $v_{S,i}$ or $v_{D,i}$. The positivity restriction on the weights $w_{S,i}$ and $w_{D,i}$ breaks the symmetry between the formulae for the two signals. It prohibits the SNN from choosing a solution where $w_{S,i} = -w_{D,i}$. These steps are illustrated using the Algorithm 1 shown in FIG. 3.

Signal Processing: The combined signals are used to produce the intermediate output values of K and csm. The value K is a measure of the anomaly or irregularity in the cell, by other hands, the csm value represents the concentration of the complete signal that a cell exposes in all its useful life. When the cell depletes its shelf life will migrate and will be ready to classify all of the antigens collected in his past useful life, at this time produce the classification as normal or abnormal. The addition of safe signals with the danger signals gives the value csm. Therefore, the value K is obtained subtracting of the danger signals twice the safe signal. The following equation gives the values:

$$K_i = DS_i - 2SS_i. \quad (7)$$

Co-stimulation (csm): The generated signals from the SNN module combine to produce two intermediate output values csm and K. By Costimulation we mean the process of cumulative concentration of signals within its environment by a DC in a period of time of his life. For a DC in the moment that his life span expires, it immediately migrates to the lymph node and exhibits antigens in certain circumstances. With the following equation the calculation of the value csm is performed:

$$csm_i = SS_i + DS_i, \quad (8)$$

where S and D are the input value for the safe and danger signals.

Lifespan: The term lifespan of a DC is used to signify the total time that a DC takes to collect all of the signal concentration on its environment previous to the migration to the lymph node. When the value of lifespan results in less than the sum of the concentration the lifespan of the DC stops of subtracting the accumulated concentration of signals over time. Thus, the value of lifespan is a fixed quantity, but overtime this value is decreasing as the following Equation (9) assures—where i=1, . . . , N−:

$$\text{lifespan} = \text{lifespan} SS_i + DS_i \quad (9)$$

Anomaly Metrics: MCAV and $K_\alpha$: Once all data are processed it is possible to calculate the mature context antigen value (MCAV) obtained from the output of the cell that comes out from the run-time process. The value is calculated for each antigen of type α, where the symbol a is associated with a collection of antigens that has in common the same value. Clearly we could think by its name that MCAV is indeed a measure of the proportion of antigen contained in a completely mature cell whose value is given by the following equation:

$$MCAV_\alpha = \frac{M}{Ag}, \quad (10)$$

where $MCAV_\alpha$ represents the antigen MCAV of the collection α, M is the number of the mature antigen of type α, and Ag is the total quantity of antigen presented for the collection of an antigen of type α. This is a probabilistic metric with values between zero and one, when the value of this metric goes to one, the probability of maturity of the cell increases. The classification rule applied is as follows in Equation (11) and the deterministic DCA could be described by means of the Algorithm 2.

$$f(x) = \begin{cases} \text{Malicious,} & \text{if } MCAV > at \\ \text{Legitimate,} & \text{otherwise} \end{cases} \quad (11)$$

Algorithm 2 Determisnistic DCA for Intrusion Detection.

Input Antigens and Signals;
Output Antigens Types and accumulative k values
1: set number of cells;
2: initialise DCs( )
3: while data do
4.    for input do
5:       if Antigens then
6:          antigenCounterC++;
7:          cell index = antigen counter modulus cells number;
8:          DC of ceil index assigned antigen;
9:          update DCs antigen profile;
10:      else         ▹ This occur for the case of signals;
11:         calculate csm and k;
12:         for all DCs do
13:            DC.lifespan− = csm;
14:            DC.k+ = k;
15:            if DC.lifespan less or equal to then
16:               logDC.k, number of antigens and iterations Algorithm 2 Determisnistic DCA for Intrusion Detection.

17:               reset DC( );
18:            end if
19:         end for
20:      end if
21:   end for
22: end while
23: for antigen Type do
24:    calculate anomaly metrics;
25: end for

EXAMPLE

Experimental Setup

To conduct this experiment, we performed it on the High-Performance Computing (HPC) called Aziz. Aziz is a Fujitsu PRIMERGY CX400, Intel True Scale QDR, Intel Xeon E5-2695v2 12C 2.4 GHz which provides a distributed computing facility. Moreover, for data exploration and visualization we used ggplot framework [72] and Seaborn [73]. For preprocessing steps and feature engineering, Pandas framework [74] and Numpy framework [75] have been used. To calculate performance metrics, scikit-learn [76] was used, and finally, for data analysis, scikit-learn framework and Keras [77] were used. We followed the Cross-Industry Standard Process (CRISP) methodology [78]. CRISP is a structured methodology for Data Mining projects conceived in 1996, which contain the following steps: Business Understanding, Data Understanding, Data Preparation, Modeling, Evaluation, and Deployment.

Data Acquisition

To illustrate the effectiveness of the model we selected The BoT-IoT dataset [79]. This data was created in the Cyber Range Lab of The Center of UNSW Canberra Cyber and has more than 72,000,000 records which include DDoS, DoS, OS and Service Scan, Keylogging and Data exfiltration attacks. Table 3 illustrates the statistics distribution of considered features.

TABLE 3

Statistical Description for The Dataset.

| Name | Value |
|---|---|
| Rows | 3,668,045 |
| Columns | 47 |
| Discrete columns | 7 |
| Continuous columns | 40 |
| All missing columns | 0 |
| Missing observations | 0 |
| Complete Rows | 3,668,045 |
| Memory allocation | 13.6 Mb |

Exploratory Data Analysis (Understating the Data): Exploratory Data Analysis (EDA) is "the process of examining a dataset without preconceived assumptions about the data and its behavior" [80]. The goal of the EDA is to evaluate the cleanliness and missing data and to explore the relationships among variables which give us a deep insight (see Table 4).

TABLE 4

Frequency disribution of considered feitures.

| Feature | Attack Type | Frequency Count | Training | Test |
|---|---|---|---|---|
| Normal | Non | 3,668,045 | 2,567,631 | 1,100,413 |
| Information Theft | Keylogging | 73 | 51 | 22 |
| | Data theft | 6 | 4 | 2 |
| Information gathering | Service scanning | 73,168 | 51,217 | 21,951 |
| | OS Fingerprinting | 17,914 | 12,540 | 5374 |
| DoS | DoS TCP | 615,800 | 431,060 | 184,740 |
| | DoS UDP | 1,032,975 | 723,082 | 30,9893 |
| | DoS HTTP | 1485 | 1039 | 446 |
| DDoS | DDoS TCP | 977,380 | 684,166 | 293,214 |
| | DDoS UDP | 948,255 | 663,778 | 284,477 |
| | DDoS HTTP | 989 | 692 | 297 |

Preparation Steps of Bot-IoT Dataset
Handling Categorical Variables

Figure 5:
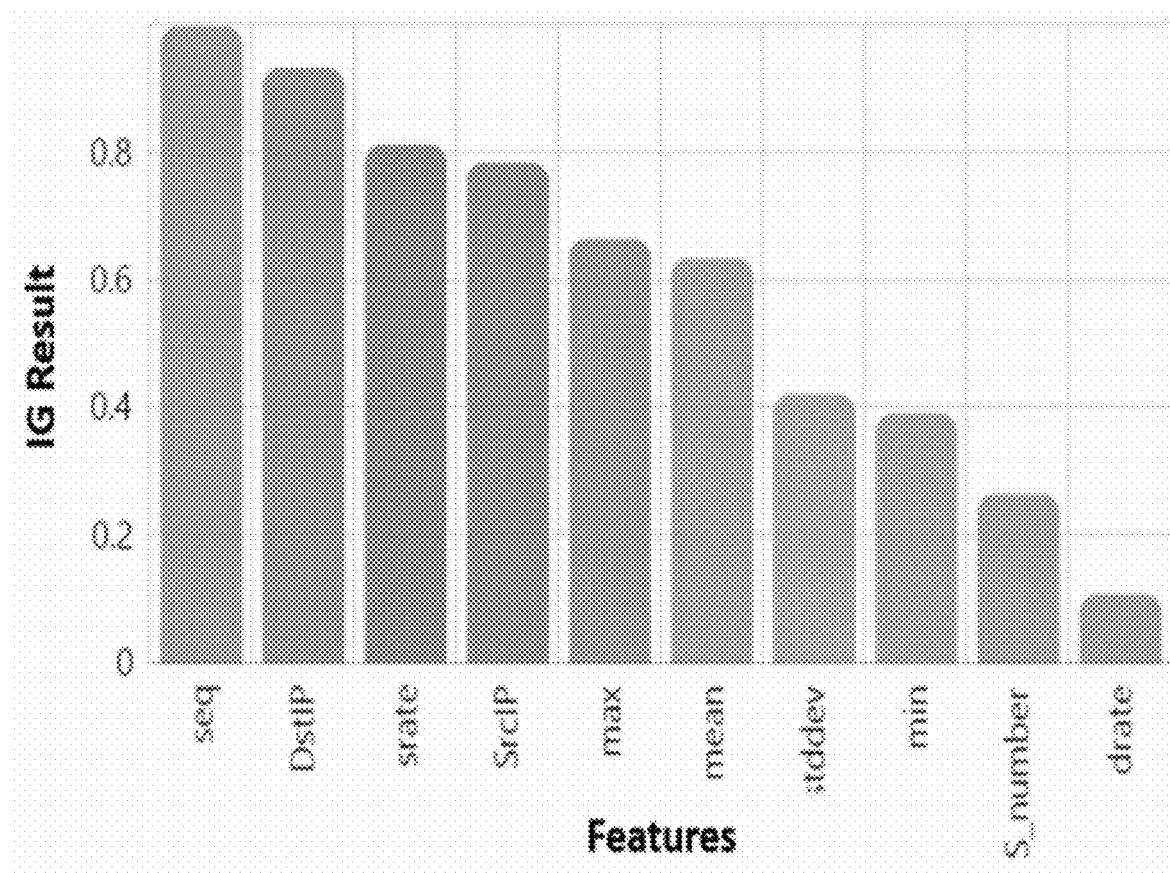
FIG. 5 is a bar graph illustrating information gain for a plurality of features from IoT data.

The categorical feature values ('saddr', 'sport', 'daddy', 'dport', 'state', 'category', and 'subcategory') are converted into numeric values for easily applying feature selection method and the DeepDCA algorithm Feature Selection Feature selection is a primary step to enhance IDS performance, reduce the computational cost and improve accuracy. In the original dataset, a selection of the 10 best features has been provided (see Table 5). In this work, we used the best 10 features and adopted the Information Gain (IG) approach to decide which features are more important. FIG. 5 shows information gain for each feature. The features ('seq', 'DstIP', 'srate', 'SrcIP', 'max'), are the most discriminative attribute. While the rest ('mean', 'stddev', 'min', 'state_number', 'drate') have small maximum information gain (smaller than 0.5), which contribute little to intrusion detection.

TABLE 5

BoT-IoT best 10 features Description.

| Feature | Data Type | Description |
|---|---|---|
| pkSeqID | Ordinal | Row Identifier |
| Seq | Numerical | Argus sequence number |
| Mean | Numerical | Average duration of aggregated records |
| Stddev | Numerical | Standard deviation of aggregated records |
| Min | Numerical | Minimum duration of aggregated records |
| Max | Numerical | Maximum duration of aggregated records |
| Srate | Numerical | Source-to-destination packets per second |
| Drate | Numerical | Destination-to-source packets per second |
| NINConn PSrcIP | Numerical | Total Number of packets per source IP |
| NINConn PDstIP | Numerical | Total Number of packets per Destination IP |

DeepDCA-Based Classification
Initialization

In this phase, we initialized the population of DCA with size up to a limit of 100 cells. Then, an array size named antigens was set to store antigens per iteration. Finally, we initialized the output parameters K and CSMK to zero.

Signals and Antigen

Figure 6A:
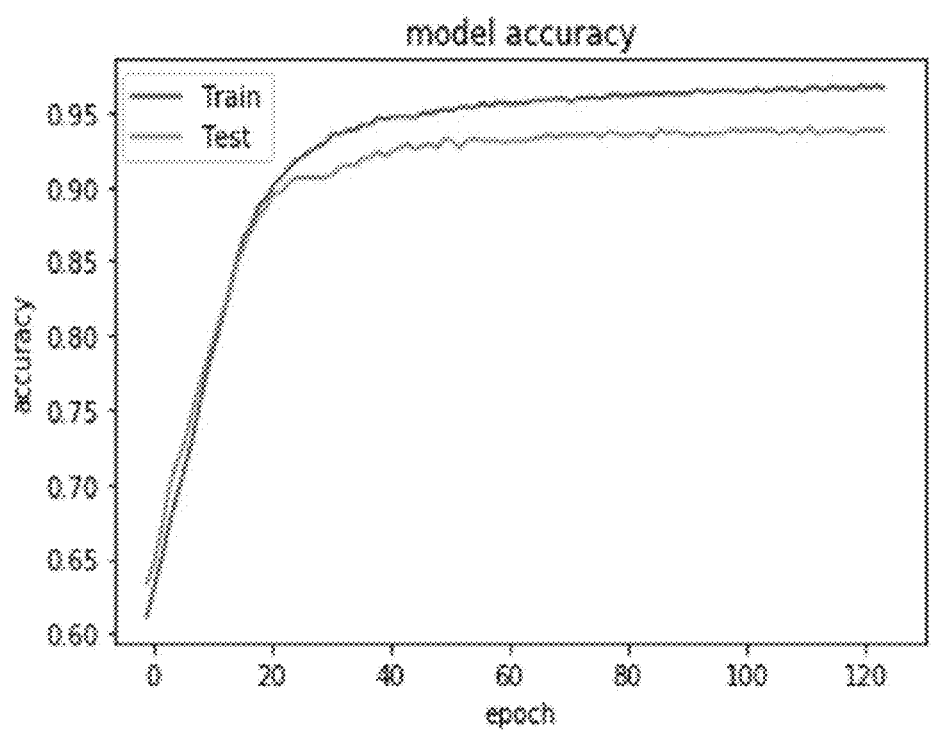
FIGS. 6A-B are graphs showing the SNN model accuracy and loss.
Figure 6B:
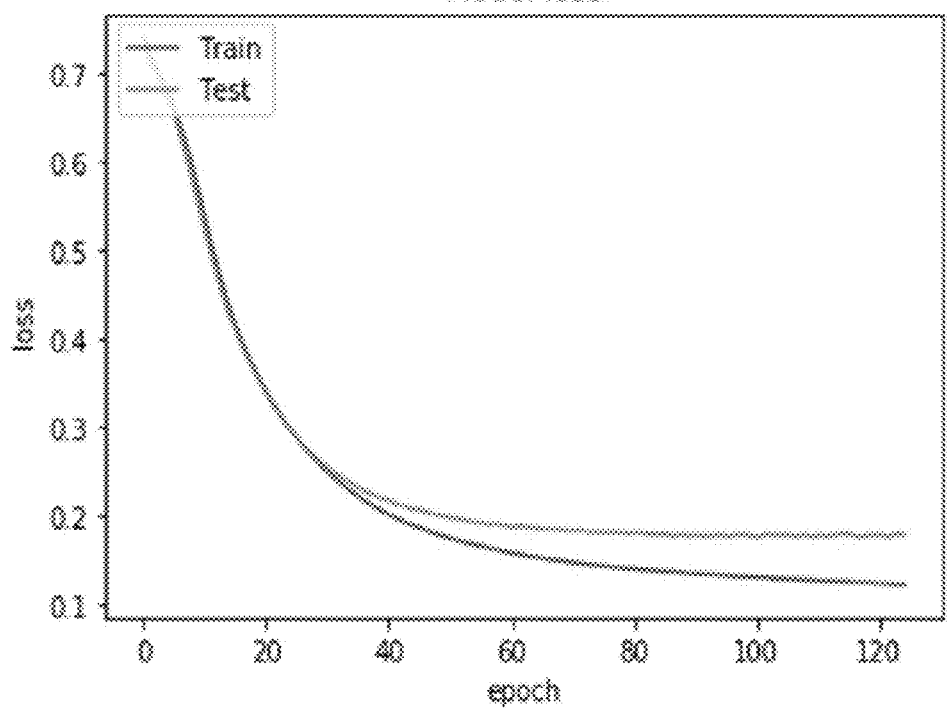

The antigen is represented by an attribute of the dataset which identifies the traffic packets uniquely. In an exemplary case the antigen is "pkSeqID" attribute. For the Signals, SNN models are used to implement a parametrized signal extraction process for the DCA. An example is defined to have 1 input layer with six neurons equal to the number of input features, one hidden layer, and 1 output neuron for the binary classification. The Model was trained in 125 epochs. The task of the hidden layer neurons would be to encode the decision for a threshold and transform the input attributes into signals normalized into the interval [0, 1] (hence, sigmoid activation). Therefore, the hidden layer neurons should decide for a sign and threshold for each feature. Then, we used selu activation functions for the hidden layer and an alpha—dropout layer between the hidden layer and the output neurons. The output neurons can choose a sign and weight per input signal, and would again yield signals within the interval [0, 1]. FIG. 6 represents the accuracy and loss of SNN model.

Dendritic Cell Algorithm Module

Once the data pre-processing phase is performed, the model moves to the next stages, as described above, which are the Signal Processing, the Context Assessment, and the Classification Procedure.

Evaluation Criteria

The confusion matrix is usually used to evaluate the performance of the classification model. The confusion matrix relies on the four terms of True Positive (TP), True Negative (TN), False Negative (FN) and False Positive (FP) [81] as shown in Table 6.

TP: is the number of actual malicious records classified as attacks.

FP: is the number of actual legitimate records classified as attacks.

TN: is the number of actual legitimate records identified as normal.

FN: is the actual anomalous records categorized as normal.

TABLE 6

Confusion Matrix.

| | | Predicted | |
|---|---|---|---|
| | | Positive | Negative |
| Actual | Positive | True Positive | False Negative |
| | Negative | False Positive | True Negative |

Also, we evaluate the performance of DeepDCA model in terms of Accuracy, Precision, Recall, F-measure, and False alarm rate:

$$\text{Accuracy} = \frac{TP + TN}{TP + TN + FP + FN} \quad (12)$$

$$\text{Precision} = \frac{TP}{TP + FP} \quad (13)$$

$$\text{Recall} = \frac{TP}{TP + FN} \quad (14)$$

$$F-\text{measure} = 2 * \frac{\text{Precision} * \text{Recall}}{\text{Precision} + \text{Recall}} \quad (15)$$

Result and Analysis

This section presents the results obtained when applying the DeepDCA model for intrusion detection. Several hyperparameters are examined such as the selected features and the attack types.

Impact of Features

Figure 7:
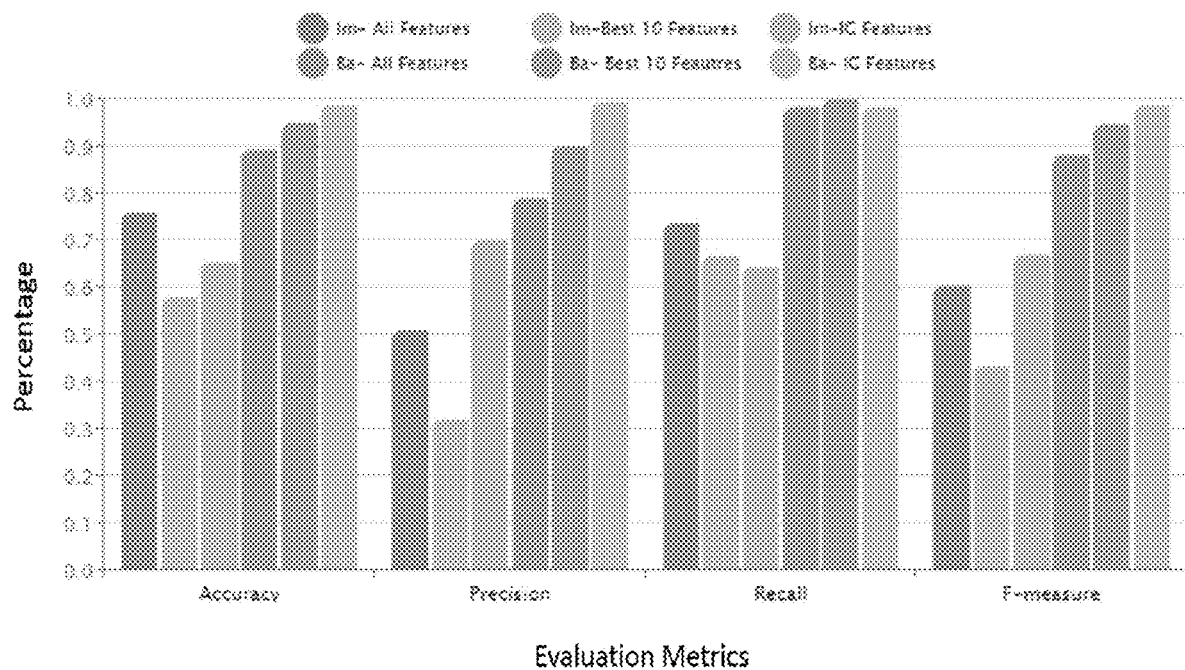
FIG. 7 is a bar graph showing a comparison of the features impact on the classification process for both imbalanced dated and balanced data.

Table 7 illustrates the influence of the features employed in the learning process. The first three records in the table represent the result of the imbalanced data. We examined all features of the BoT-IoT then identified the best 10 features, and finally, we selected features using information gain. As the accuracy is misleading for metrics when dealing with imbalanced classes problem, it is noted that Precision F-measures are telling a more truthful story. Precision is a measure of exactness. Recall for completeness of a model, the F-measure is a harmonic mean of the two. As shown in Table 7, even though the accuracy for all features of the imbalanced classes gets a better result, the rest of the metrics are not in line with it. The IG-selected features have the best indication of detection performance for imbalanced classes. On the other hand with balanced data, as expected fewer features render better results in general. The results produce slightly worse when added to the full features set. Consequently, DeepDCA yields a better result when dealing with balanced classes and features that have a higher importance in the detection process. For making it easier to compare the results, FIG. 7 shows the same results in a different format.

TABLE 7

Deep DCA performance based on Features Impact among Imbalanced and Balanced Data.

| Features | | Accuracy | Precision | Recall | F-Measure |
|---|---|---|---|---|---|
| Im-Data | All | 0.7613 | 0.5091 | 0.7368 | 0.6022 |
| | Best 10 | 0.5800 | 0.3200 | 0.6667 | 0.4324 |
| | IG | 0.6550 | 0.7000 | 0.6422 | 0.6699 |
| Ba-Data | All | 0.8950 | 0.7900 | 0.9836 | 0.8827 |
| | Best 10 | 0.9500 | 0.9000 | 1.0000 | 0.9474 |
| | IG | 0.9873 | 0.9917 | 0.9836 | 0.9877 |

Impact of Attack Scenarios

We evaluated the proposed IDS by measuring the performance metrics in different attack scenarios as shown in Table 8. The results illustrated that DeepDCA performed well in detecting various attack types although its performance was better in DDoS/DoS attacks which may be due to the abundance of data about this attack in the BoT-IoT dataset.

TABLE 8

Deep DCA Performance Evaluation Metrics in Different Attack Categories.

| Attack | Accuracy | Precision | Recall | F-Measure |
|---|---|---|---|---|
| DoS | 99.8% | 99.5% | 98.53% | 99.012% |
| DDoS | 99.9% | 100% | 100% | 100% |
| Reconnaissance | 99.10% | 98.88% | 98.22% | 98.54% |
| Information Theft | 98.56% | 99.01% | 98.9% | 98.95% |

Comparison with Classifiers

The performance evaluation results of the DeepDCA model are compared with four commonly used methods for intrusion detection, namely the Support-Vector Machines (SVM), Naive Bayes (NB), K Nearest Neighbor (KNN) and Multilayer Perceptron (MLP). The comparison made is in terms of Accuracy, F-measure, Recall/sensitivity and Precision. Table 9 shows that DeepDCA slightly better than MLP and outperformed other classifiers SVM, NB and KNN. To sum up, applying the DeepDCA for the Intrusion detection system was validated against an IoT dataset demonstrating over 98.73% accuracy. It was able to identify successfully different types of attacks and showed good performances in terms of detection rate and false-positive rates.

TABLE 9

Comparison of Classifiers Performance.

| Classifiers | Accuracy | Precision | Recall | F-Measure |
|---|---|---|---|---|
| KNN | 91.69% | 91.99% | 93.75% | 94.31% |
| NB | 95.00% | 95.00% | 94.60% | 94.30% |
| SVM | 96.00% | 96.80% | 96.00% | 97.00% |
| MLP | 97.59% | 97.99% | 96.00% | 96.37% |
| Proposed IDS | 98.73% | 99.17% | 98.36% | 98.77% |

REFERENCES

1. Kim, N.; Lee, I.; Zazo, J.; Belei, B. Internet of Things EDITOR. Technical report, 2019.
2. Airehrour, D.; Gutierrez, J.; Ray, S. K. Secure routing for internet of things: A survey. J. Netw. Comput. Appl. 2016, 66, 198-213. [CrossRef]
3. Yang, Y.; Wu, L.; Yin, G.; Li, L.; Zhao, H. A Survey on Security and Privacy Issues in Internet-of-Things. IEEE Internet Things J. 2017, 4, 1250-1258. [CrossRef]
4. RTE Ltd. FreeRTOS—Market leading RTOS (Real Time Operating System) for embedded systems with Internet of Things extensions, 2018.
5. Malwarebytes LABS. 2019 State of Malware. Technical report, 2019; p. 33.
6. Kolias, C.; Kambourakis, G.; Stavrou, A.; Voas, J. DDoS in the IoT: Mirai and other botnets. Computer 2017, 50, 80-84. [CrossRef]
7. Zahra, A.; Shah, M. A. IoT based ransomware growth rate evaluation and detection using command and control blacklisting. In Proceedings of the ICAC 2017-2017 23rd IEEE International Conference on Automation and Computing: Addressing Global Challenges through Automation and Computing, Huddersfield, UK, 7-8 Sep. 2017; pp. 1-6. [CrossRef]
8. Yaqoob, I.; Ahmed, E.; ur Rehman, M. H.; Ahmed, A. I. A.; Al-garadi, M. A.; Imran, M.; Guizani, M. The rise of ransomware and emerging security challenges in the Internet of Things. Comput. Netw. 2017, 129, 444-458. [CrossRef]
9. Lin, J.; Yu, W.; Zhang, N.; Yang, X.; Zhang, H.; Zhao, W. A Survey on Internet of Things: Architecture, Enabling Technologies, Security and Privacy, and Applications. IEEE Internet Things J. 2017, 4, 1125-1142. [CrossRef]
10. Timmis, J.; Hone, A.; Stibor, T.; Clark, E. Theoretical advances in artificial immune systems. Theor. Comput. Sci. 2008, 403, 11-32. [CrossRef]
11. Seredynski, F.; Bouvry, P. Anomaly detection in TCP/IP networks using immune systems paradigm. Comput. Commun. 2007, 30, 740-749. [CrossRef]
12. Kim, J.; Bentley, P. An Artificial Immune Model for Network Intrusion Detection. In Proceedings of the 7th European Congress on Intelligent Techniques and Soft Computing (EUFIT'99), Aachen, Germany, 13-16 Sep. 1999.
13. Saleem, K.; Fisal, N.; Hafizah, S.; Rashid, R. A. An intelligent information security mechanism for the network layer of WSN: BIOSARP. In Lecture Notes in Computer Science (Including Subseries Lecture Notes in Artificial Intelligence and Lecture Notes in Bioinformatics); Springer: Berlin/Heidelberg, Germany, 2011; Volume 6694 LNCS, pp. 118-126. [CrossRef]
14. Suthaharan, S. Big data classification. ACM SIGMETRICS Perform. Eval. Rev. 2014, 41, 70-73. [CrossRef] Appl. Sci. 2020, 10, 1909 20 of 23

15. Mazhar, N.; Farooq, M. BeeAIS: Artificial immune system security for nature inspired, MANET routing protocol, BeeAdHoc. In Proceedings of the 6th International Conference on Artificial Immune Systems, Santos, Brazil, 26-29 Aug. 2007; Springer: Berlin/Heidelberg, Germany, 2007; pp. 370-381. [CrossRef]
16. Mazhar, N.; Farooq, M. A sense of danger. In Proceedings of the 10th Annual Conference on Genetic And Evolutionary Computation—GECCO '08, Atlanta, Ga., USA, 12-16 Jul. 2008; ACM Press: New York, N.Y., USA, 2008; p. 63. [CrossRef]
17. Aldhaheri, S.; Alghazzawi, D.; Cheng, L.; Barnawi, A.; Alzahrani, B. A. Artificial Immune Systems approaches to secure the internet of things: A systematic review of the literature and recommendations for future research. J. Netw. Comput. Appl. 2020, 102537. [CrossRef]
18. Harmer, P. K.; Williams, P. D.; Gunsch, G. H.; Lamont, G. B. An artificial immune system architecture for computer security applications. IEEE Trans. Evolut. Comput. 2002, 6, 252-280. [CrossRef]
19. Jungwon, K.; Bentley, P. Towards an artificial immune system for network intrusion detection: An investigation of clonal selection with a negative selection operator. In Proceedings of the 2001 Congress on Evolutionary Computation (IEEE Cat. No. 01TH8546), Seoul, Korea, 27-30 May 2001; Volume 2, pp. 1244-1252. [CrossRef]
20. Kim, J.; Bentley, P. J. An evaluation of negative selection in an artificial immune system for network intrusion detection. In Proceedings of the Genetic and Evolutionary Computation Conference (GECCO), San Francisco, Calif., USA, 7-11 Jul. 2001; pp. 1330-1337. [CrossRef]
21. Greensmith, J.; Aickelin, U.; Cayzer, S. Introducing Dendritic Cells as a Novel Immune-Inspired Algorithm for Anomaly Detection. 2016. [CrossRef]
22. Alves, R. T.; Delgado, M. R.; Lopes, H. S.; Freitas, A. A. An Artificial Immune System for Fuzzy-Rule Induction in Data Mining; Springer: Berlin/Heidelberg, Germany, 2004; pp. 1011-1020. [CrossRef]
23. Freitas, A. A.; Timmis, J. Revisiting the foundations of artificial immune systems for data mining. IEEE Trans. Evolut. Comput. 2007, 11, 521-540. [CrossRef]
24. De Castro, L. N.; Timmis, J. Artificial Immune Systems: A Novel Paradigm to Pattern Recognition. Neural Netw. Pattern Recognit. 2002, 67-84.
25. Hart, E.; Ross, P.; Nelson, J. Producing robust schedules via an artificial immune system. In Proceedings of the 1998 IEEE International Conference on Evolutionary Computation Proceedings, IEEE World Congress on Computational Intelligence (Cat. No. 98TH8360), Anchorage, Ak., USA, 4-9 May 1998; pp. 464-469. [CrossRef]
26. Engin, O.; Döyen, A. A new approach to solve hybrid flow shop scheduling problems by artificial immune system. Future Gener. Comput. Syst. 2004, 20, 1083-1095. [CrossRef]
27. Coello, C. A.; Cortés, N.C. Solving multiobjective optimization problems using an artificial immune system. Genet. Program. Evolvable Mach. 2005, 6, 163-190. [CrossRef]
28. Alonso, F. R.; Oliveira, D. Q.; Zambroni De Souza, A. C. Artificial immune systems optimization approach for multiobjective distribution system reconfiguration. IEEE Trans. Power Syst. 2015, 30, 840-847. [CrossRef]
29. Huang, X.; Tan, Y.; He, X. An intelligent multifeature statistical approach for the discrimination of driving conditions of a hybrid electric vehicle. IEEE Trans. Intell. Transp. Syst. 2011, 12, 453-465. [CrossRef]
30. Gu, S.; Tan, Y.; He, X. Recentness biased learning for time series forecasting. Inf. Sci. 2013, 237, 29-38. [CrossRef]
31. Ishiguro, A.; Kondo, T.; Watanabe, Y.; Shirai, Y.; Uchikawa, Y. Emergent construction of artificial immune networks for autonomous mobile robots. In Proceedings of the 1997 IEEE International Conference on Systems, Man, and Cybernetics. Computational Cybernetics and Simulation, Orlando, Fla., USA, 12-15 Oct. 1997; Volume 2, pp. 1222-1228. [CrossRef]
32. Greensmith, J. The Dendritic Cell Algorithm. Ph.D. Thesis, University of Nottingham, Nottingham, U K, 2007.
33. Hernández-Pereira, E.; Suárez-Romero, J. A.; Fontenla-Romero, O.; Alonso-Betanzos, A. Conversion methods for symbolic features: A comparison applied to an intrusion detection problem. Expert Syst. Appl. 2009, 36, 10612-10617. [CrossRef]
34. Zarpelão, B. B.; Miani, R. S.; Kawakani, C. T.; de Alvarenga, S. C. A survey of intrusion detection in Internet of Things. J. Netw. Comput. Appl. 2017, 84, 25-37. [CrossRef]
35. García-Teodoro, P.; Díaz-Verdejo, J.; Macía-Fernández, G.; Vázquez, E. Anomaly-based network intrusion detection: Techniques, systems and challenges. Comput. Secur. 2009, 28, 18-28. [CrossRef] Appl. Sci. 2020, 10, 1909 21 of 23
36. Kasinathan, P.; Pastrone, C.; Spirito, M. A.; Vinkovits, M. Denial-of-Service detection in 6LoWPAN based Internet of Things. In Proceedings of the International Conference on Wireless and Mobile Computing, Networking and Communications, Lyon, France, 7-9 Oct. 2013; pp. 600-607. [CrossRef]
37. Deogirikar, J.; Vidhate, A. Security attacks in IoT: A survey. In Proceedings of the International Conference on IoT in Social, Mobile, Analytics and Cloud, I-SMAC 2017, Palladam, India, 10-11 Feb. 2017; pp. 32-37. [CrossRef]
38. Ivan, C.; Vujic, M.; Husnjak, S. Classification of Security Risks in the IoT Environment. In Proceedings of the 26th DAAAM International Symposium on Intelligent Manufacturing and Automation, Zadar, Croatia, 21-24 Oct. 2015.
39. Tambe, A.; Aung, Y. L.; Sridharan, R.; Ochoa, M.; Tippenhauer, N. O.; Shabtai, A.; Elovici, Y. Detection of threats to IoT devices using scalable VPN-forwarded honeypots. In Proceedings of the CODASPY 2019—9th ACM Conference on Data and Application Security and Privacy, Dallas, Tex., USA, 25-27 Mar. 2019; pp. 85-96. [CrossRef]
40. Al Salami, S.; Baek, J.; Salah, K.; Damiani, E. Lightweight encryption for smart home. In Proceedings of the 2016 11th International Conference on Availability, Reliability and Security, ARES 2016, Salzburg, Austria, 31 Aug.-2 Sep. 2016; pp. 382-388. [CrossRef]
41. Cervantes, C.; Poplade, D.; Nogueira, M.; Santos, A. Detection of sinkhole attacks for supporting secure routing on 6LoWPAN for Internet of Things. In Proceedings of the 2015 IFIP/IEEE International Symposium on Integrated Network Management, I M 2015, Ottawa, ON, Canada, 11-15 May 2015; pp. 606-611. [CrossRef]
42. Notra, S.; Siddiqi, M.; Gharakheili, H. H.; Sivaraman, V.; Boreli, R. An experimental study of security and privacy risks with emerging household appliances. In Proceedings of the 2014 IEEE Conference on Communications and Network Security (CNS), San Francisco, Calif., USA, 29-31 Oct. 2014; pp. 79-84. [CrossRef]

43. Chen, J.; Chen, C. Design of complex event-processing IDS in internet of things. In Proceedings of the 2014 6th International Conference on Measuring Technology and Mechatronics Automation, ICMTMA 2014, Zhangjiajie, China, 10-11 Jan. 2014; pp. 226-229. [CrossRef]
44. Wen, Q.; Dong, X.; Zhang, R. Application of dynamic variable cipher security certificate in Internet of Things. In Proceedings of the 2012 IEEE 2nd International Conference on Cloud Computing and Intelligence Systems, IEEE CCIS 2012, Hangzhou, China, 30 Oct.-1 Nov. 2012; Volume 3, pp. 1062-1066. [CrossRef]
45. Kasinathan, P.; Costamagna, G.; Khaleel, H.; Pastrone, C.; Spirito, M. A. DEMO: An IDS framework for internet of things empowered by 6LoWPAN. In Proceedings of the 2013 ACM SIGSAC Conference on Computer & Communications Security—CCS '13, Berlin, Germany, 4-8 Nov. 2013; ACM Press: New York, N.Y., USA, 2013; pp. 1337-1340. [CrossRef]
46. Raza, S.; Wallgren, L.; Voigt, T. SVELTE: Real-time intrusion detection in the Internet of Things. Ad Hoc Netw. 2013, 11, 2661-2674. [CrossRef]
47. Khraisat, A.; Gondal, I.; Vamplew, P.; Kamruzzaman, J.; Alazab, A. A novel ensemble of hybrid intrusion detection system for detecting internet of things attacks. Electronics 2019, 8, 1210. [CrossRef]
48. Khater, B. S.; Wahab, A. W. B. A.; Idris, M. Y. I. B.; Hussain, M. A.; Ibrahim, A. A. A lightweight perceptron-based intrusion detection system for fog computing. Appl. Sci. 2019, 9, 178. [CrossRef]
49. Lopez-Martin, M.; Carro, B.; Sanchez-Esguevillas, A.; Lloret, J. Network Traffic Classifier with Convolutional and Recurrent Neural Networks for Internet of Things. IEEE Access 2017, 5, 18042-18050. [CrossRef]
50. AL-Hawawreh, M.; Moustafa, N.; Sitnikova, E. Identification of malicious activities in industrial internet of things based on deep learning models. J. Inf. Secur. Appl. 2018, 41, 1-11. [CrossRef]
51. Tama, B. A.; Rhee, K. H. Attack Classification Analysis of IoT Network via Deep Learning Approach. Res. Briefs Inf. Commun. Technol. Evol. (ReBICTE) 2017. [CrossRef]
52. Su, J.; Vargas, D. V.; Prasad, S.; Sgandurra, D.; Feng, Y.; Sakurai, K. Lightweight Classification of IoT Malware based on Image Recognition. In Proceedings of the 2018 IEEE 42nd Annual Computer Software and Applications Conference (COMPSAC), Tokyo, Japan, 23-27 Jul. 2018; pp. 664-669.
53. Bansal, A.; Mahapatra, S. A comparative analysis of machine learning techniques for botnet detection. In Proceedings of the 10th International Conference on Security of Information and Networks—SIN '17, Jaipur, India, 17 Jul. 2017; ACM Press: New York, N.Y., USA, 2017; pp. 91-98. [CrossRef] Appl. Sci. 2020, 10, 1909 22 of 23
54. Aminanto, M. E.; Kim, K. Deep Learning-based Feature Selection for Intrusion Detection System in Transport Layer. Available online: https://pdfs.semanticscholar.org/bf07/e753401b36662eee7b8cd6c65cb8cfe31562.pdf (accessed on 23 Feb. 2019).
55. Canedo, J.; Skjellum, A. Using machine learning to secure IoT systems. In Proceedings of the 2016 14th Annual Conference on Privacy, Security and Trust, P S T 2016, Auckland, New Zealand, 12-14 Dec. 2016; pp. 219-222. [CrossRef]
56. Hodo, E.; Bellekens, X.; Hamilton, A.; Dubouilh, P. L.; Iorkyase, E.; Tachtatzis, C.; Atkinson, R. Threat analysis of IoT networks using artificial neural network intrusion detection system. In Proceedings of the 2016 International Symposium on Networks, Computers and Communications (ISNCC), Yasmine Hammamet, Tunisia, 11-13 May 2016; pp. 1-6. [CrossRef]
57. Chawla, S.; Thamilarasu, G. Security as a Service: Real-time Intrusion Detection in Internet of Things. In Proceedings of the Fifth Cybersecurity Symposium, CyberSec '18, Coeur d'Alene, Id., USA, 9-11 Apr. 2018; pp. 12:1-12:4
58. Jin, Y. L.; Ding, Y. S.; Hao, K. R.; Liu, Y. J. Efficient service request detection algorithm based on hormone regulation mechanism in the Internet of things. J. China Univ. Posts Telecommun. 2013, 20, 86-90. [CrossRef]
59. Matzinger, P. Tolerance, Danger, and the Extended Family. Ann. Rev. Immunol. 1994, 12, 991-1045. [CrossRef]
60. Matzinger, P. The danger model: A renewed sense of self. Science 2002, 296, 301-305.
61. Aickelin, U.; Cayzer, S. The Danger Theory and Its Application to Artificial Immune Systems. In Proceedings of the 7th International Conference on Artificial Immune Systems (ICARIS-2008), Phuket, Thailand, 10-13 Aug. 2008; pp. 141-148. [CrossRef]
62. Chelly, Z.; Elouedi, Z. A survey of the dendritic cell algorithm. Knowl. Inf. Syst. 2016, 48, 505-535. [CrossRef]
63. Klambauer, G.; Unterthiner, T.; Mayr, A.; Hochreiter, S. Self-Normalizing Neural Networks. In Proceedings of the Advances in Neural Information Processing Systems 30 (NIPS 2017), Long Beach, Calif., USA, 4-9 Dec. 2017.
64. Ioffe, S.; Szegedy, C. Batch normalization: Accelerating deep network training by reducing internal covariate shift. In Proceedings of the 32nd International Conference on Machine Learning, ICML 2015, Lille, France, 6-11 Jul. 2015; Volume 1, pp. 448-456.
65. Chmielewski, A.; Brzozowski, M. Immune approach to the protection of IoT devices. In Lecture Notes in Computer Science (Including Subseries Lecture Notes in Artificial Intelligence and Lecture Notes in Bioinformatics); Springer: Cham, Swizerland, 2016; Volume 10018 LNCS, pp. 75-92. [CrossRef]
66. Chen, R.; Liu, C. M.; Xiao, L. X. A Security Situation Sense Model Based on Artificial Immune System in the Internet of Things. Adv. Mater. Res. 2011, 403-408, 2457-2460. [CrossRef]
67. Liu, C.; Yang, J.; Chen, R.; Zhang, Y.; Zeng, J. Research on immunity-based intrusion detection technology for the Internet of Things. In Proceedings of the 2011 7th International Conference on Natural Computation, ICNC 2011, Shanghai, China, 26-28 Jul. 2011; Volume 1, pp. 212-216. [CrossRef]
68. Liu, C.; Zhang, Y.; Cai, Z.; Yang, J.; Peng, L. Artificial immunity-based security response model for the internet of things. J. Comput. 2013, 8, 3111-3118. [CrossRef]
69. Arrington, B.; Barnett, L. E.; Rufus, R.; Esterline, A. Behavioral modeling intrusion detection system (BMIDS) using internet of things (IoT) behavior-based anomaly detection via immunity-inspired algorithms. In Proceedings of the 2016 25th International Conference on Computer Communications and Networks, ICCCN 2016, Waikoloa, Hi., USA, 1-4 Aug. 2016; pp. 1-6. [CrossRef]
70. Yang, Z.; Ding, Y.; Jin, Y.; Hao, K. Immune-Endocrine System Inspired Hierarchical Coevolutionary Multiobjective Optimization Algorithm for IoT Service. IEEE Trans. Cybern. 2018, 50, 164-177. [CrossRef] [PubMed]
71. Kayacik, H. G.; Zincir-Heywood, A. N.; Heywood, M. I. Selecting features for intrusion detection: A feature relevance analysis on KDD 99 intrusion detection data-sets. In Proceedings of the Third Annual Conference on Privacy, Security and Trust, Fredericton, NB, Canada, 12-14 Oct. 2005.
72. Wickham, H.; Winston, C. Create Elegant Data Visualisations Using the Grammar of Graphics. R Package Version 3.1.0. Available online: https://CRAN.R-project.org/package=ggplot2 (accessed on 12 May 2019).
73. Waskom, M.; Botvinnik, 0.; Hobson, P.; Cole, J. B.; Halchenko, Y.; Hoyer, S.; Miles, A.; Augspurger, T.; Yarkoni, T.; Megies, T.; et al. Seaborn: Statistical data visualization. 2018. Appl. Sci. 2020, 10, 1909 23 of 23
74. McKinney, W. pandas: A Foundational Python Library for Data Analysis and Statistics. In Proceedings of the Workshop Python for High Performance and Scientific Computing (SC11), Seattle, Wash., USA, 18 Nov. 2011.
75. Oliphant, T. E. Guide to NumPy. Methods 2010, 1, 378. [CrossRef] 76. Pedregosa, F.; Michel, V.; Grisel, O.; Blondel, M.; Prettenhofer, P.; Weiss, R.; Vanderplas, J.; Cournapeau, D.; Pedregosa, F.; Varoquaux, G.; et al. Scikit-learn: Machine Learning in Python Gael Varoquaux Bertrand Thirion Vincent Dubourg Alexandre Passos PEDREGOSA, VAROQUAUX, GRAMFORT ET AL. Matthieu Perrot. Technical report, 2011.
77. van Merriënboer, B.; Bandanau, D.; Dumoulin, V.; Serdyuk, D.; Warde-Farley, D.; Chorowski, J.; Bengio, Y. Blocks and Fuel: Frameworks for deep learning. 2015.
78. Chapman, P.; Clinton, J.; Kerber, R.; Khabaza, T.; Reinartz, T.; Shearer, C. R. H.; Wirth, R. CRISP-DM 1.0 Step-by-Step Data Mining Guide. 1999.
79. Koroniotis, N.; Moustafa, N.; Sitnikova, E.; Turnbull, B. Towards the development of realistic botnet dataset in the Internet of Things for network forensic analytics: Bot-IoT dataset. Future Gener. Comput. Syst. 2019, 100, 779-796. [CrossRef]
80. Collins, M. Network Security Through Data Analysis II; O'Reilly Media: Sebastopol, Calif., USA, 2014; p. 347.
81. Lippmann, R.; Haines, J. W.; Fried, D. J.; Korba, J.; Das, K. 1999 DARPA off-line intrusion detection evaluation. Comput. Netw. 2000, 34, 579-595. [CrossRef]

The invention claimed is:

1. A method for intrusion detection in an internet of things (IoT) environment, comprising:
   evaluating with a computer or system of computers sensed IoT data which performs feature selection based on information gain and which produces a plurality of features;
   extracting with the computer or system of computers dendritic cell algorithm signals from the plurality of features using a self normalizing neural network and categorizing each as being safe or dangerous,
      wherein a sigmoid activation function at output neurons assures that the signals are contained in a range 0-100,
      wherein a scaled exponential linear units (SeLU) activation function at hidden layer neurons in the self normalizing neural network cuts off high or low values of a feature attribute depending on signs of parameters $v_{S,i}$ or $v_{D,i}$,
      wherein positivity restriction on weights $w_{S,i}$ and $w_{D,i}$ breaks a symmetry between formulae for safe signals and danger signals, and
      wherein the self normalizing neural network is prevented from choosing a solution where $w_{S,i}=-w_{D,i}$; and
   processing with the computer or computer system the extracted signals using a deterministic dendritic cell algorithm to identify intrusion detection.

2. The method of claim 1 wherein processing comprises calculation of a co-stimulation (csm) value, calculation of a lifespan value, and calculation of an anomaly metric.

3. The method of claim 1 wherein the feature selection selects one or more of an Argus sequence number, a total number of packets per destination IP, a source-to-destination packets per second, a total number of packets per source IP, and a maximum duration of aggregated records.

4. The method of claim 1 wherein the feature selection selects a plurality of an Argus sequence number, a total number of packets per destination IP, a source-to-destination packets per second, a total number of packets per source IP, and a maximum duration of aggregated records.

5. The method of claim 1 wherein the feature selection selects each of an Argus sequence number, a total number of packets per destination IP, a source-to-destination packets per second, a total number of packets per source IP, and a maximum duration of aggregated records.

6. The method of claim 1 wherein features selected in feature selection have an information gain of 0.5 to 1.

7. The method of claim 1 wherein the self normalizing neural network has an input layer with a number of neurons equivalent to a number of input features, a hidden layer which includes the hidden layer neurons and encodes a decision for a threshold and transforms input attributes into signals normalized into an interval of [0, 1], and one output neuron for binary classification.

8. The method of claim 1 wherein the danger signals are indicative of an anomalous situation or attack, and wherein the safe signals are indicative of normal behavior.

9. The method of claim 8 wherein processing further comprises subtracting from a value of the signals categorized as being indicative of anomalous situation or attack twice a value of the signals categorized as being indicative of normal behavior.

10. The method of claim 8 wherein processing further comprises adding respective values of the signals categorized as being indicative of anomalous situation or attack to respective values of the signals categorized as being indicative of normal behavior.

11. An intrusion detection system, comprising a computer or computer system for receiving sensor data from an internet of things environment, wherein the computer or computer system is encoded with instructions for performing the method of claim 1.

* * * * *